United States Patent [19]

Bussey, Jr.

[11] 4,440,704

[45] Apr. 3, 1984

[54] METHOD FOR MAKING EXPANDABLE FILLING ELEMENTS OF BILLOWED CONFIGURATION FOR PACKAGING

[76] Inventor: Harry Bussey, Jr., P.O. Box 115 Serpentine Rd., Navesink, N.J. 07752

[21] Appl. No.: 400,719

[22] Filed: Jul. 22, 1982

Related U.S. Application Data

[62] Division of Ser. No. 230,113, Jan. 29, 1981, abandoned.

[51] Int. Cl.³ .............................................. B29D 27/00
[52] U.S. Cl. ...................................... 264/51; 264/54; 264/142; 425/311; 425/817 R
[58] Field of Search ........................... 264/51, 142, 54; 425/308, 311, 817 R

[56] References Cited

U.S. PATENT DOCUMENTS

3,389,204 6/1968 Häfliger .............................. 264/142
3,961,000 6/1976 Ropiequet ......................... 264/53 X

FOREIGN PATENT DOCUMENTS

505991 11/1951 Belgium .............................. 264/142

Primary Examiner—Philip E. Anderson
Attorney, Agent, or Firm—Kenyon & Kenyon

[57] ABSTRACT

A plastified mass of thermoplastic material containing an expanding agent is extruded and sliced into pieces by shaped cutting edges to produce—on expanding—elements which are shaped in a billowed manner or a double-bubble manner. The billowed elements have an inturned peripheral edge which prevents nesting and interlocking together when used in a shipping container. Similarly, the double bubble elements preclude nesting and interlocking.

21 Claims, 17 Drawing Figures

METHOD FOR MAKING EXPANDABLE FILLING ELEMENTS OF BILLOWED CONFIGURATION FOR PACKAGING

This is a division of application Ser. No. 230,113, filed Jan. 29, 1981, now abandoned.

This invention relates to loose fill packaging elements and to a method and apparatus for making filling elements for loose fill packaging.

As is known, various types of loose fill packing elements have been used to insulate articles in shipping containers against damage from vibration and impact forces during shipment of the articles. In many cases, in order to avoid the disadvantages of packaging materials such as sawdust, popcorn, excelsior and the like, resort has been made to the use of resilient thermoplastic elements. These elements have been produced in various shapes in order to provide a cushioning effect for the articles being shipped, and a nesting or interlocking arrangement which forestalls a shifting or migration of the cushioned article within the shipping container in the course of the shipment of the article.

Heretofore, in order to manufacture the resilient thermoplastic packaging elements, it has been known to extrude a heat-plastified mass of thermoplastic material containing an expanding agent through an orifice to form a rod which is then severed at longitudinal increments into discrete elements. In some cases, it has been known to cool the rod after extrusion and prior to cutting. In such cases, the subsequently cut elements are of an expandable nature. That is, the elements can be subjected to heat at a later time to cause an expansion of the elements due to the expanding agent incorporated therein. Such foamable elements can be shipped in bulk to the ultimate user and thereafter expanded under heat into a foamed useable state. Where the shapes of the elements permit, the foamed elements can then be poured from hoppers or the like into individual shipping containers. In other cases, the extruded rod can be cut prior to cooling so that discrete elements severed from the rod can be individually cooled into an expandable state.

Generally, the elements which have been produced by an extrusion of a thermoplastic material through an orifice of a die and a severing of a resultant rod have had a uniform thickness. That is, each element has had a constant dimension in the direction of the extrusion and a substantially regular shape. Because of the regular shape, the thermoplastic elements have often tended to pack together within a shipping container such that the bulk weight of the elements in the container is relatively high. Accordingly, attempts have been made to impart shapes to the elements which tend to create large empty spaces among the elements in a container and thereby reduce the bulk weight of the packaging material. These attempts, however, have generally been directed towards the providing of a specific type of cross-section to produce an irregular shape. For example, it has been known to extrude a formable thermoplastic material through an orifice to produce a rod-like length having an irregular cross-section, for example of a somewhat triangular shape, C-shape or E-shape and to thereafter sever the rod into segments. It has also been known to extrude the thermoplastic material to form a cylindrical rod which is subsequently sliced into thin pieces which, after being heat-expanded, deform into a somewhat partly spherical shape. Other techniques have also been known, such as described in U.S. Pat. No. 4,104,440, for making packaging particles with a normally curved configuration having two curved substantially coextensive surfaces with one surface being concave and comprised of a substantially unfoamed skin while the remainder of the particle is foamed. Also, as described in U.S. Pat. No. 3,961,000, it has been known to extrude a plastic composition through an orifice such that the protruding mass is bounded by a convex surface that extends from the perimeter of the orifice in a partially spherical sweep, to cut off the protruding mass along a path which is substantially straight or linear as compared to the convex surface, and to expand and cool the resultant pieces to form bodies having hollow substantially hemispherical configurations. These bodies are formed so as to either nest or interlock with each other in order to prevent migration.

In essence, the previously known techniques have relied upon the severing of an extruded material in a straight line manner; that is, the severing of the extruded rod has been carried out by using a straight edged blade which cuts in a direction perpendicular to the longitudinal axis of the extruded rod. As a result, the resulting packaging elements, after foaming, are generally of regular shape conforming to the unexpanded state. While such elements may be free-flowing when poured into a shipping container from a supply nozzle, the elements tend to interlock in use within the shipping container and thus occupy less space (i.e. taking on a greater bulk density) than necessary in shipping containers.

Accordingly, it is an object of the invention to provide a method of making expandable filling elements which are capable of deforming in a three dimensional manner upon foaming.

It is another object of the invention to provide the use of a simple means of forming discrete foamable thermopastic elements which are capable of foaming into regular non-interlocking shapes.

It is another object of the invention to provide the use of a simple apparatus for making filling elements of regular three dimensional shapes.

It is another object of the invention to provide loose fill packing elements of three dimensional billowed shapes.

It is another object of the invention to reduce the bulk density of a loose fill packaging material to a minimum.

Briefly, the invention is directed to a method for making expandable filling elements for packaging. In addition, the invention is directed to the manufacture of a loose fill packing element of expandable thermoplastic material and a loose fill packaging material made of such elements.

In accordance with the method, a heat-plastified mass of thermoplastic material containing an expanding agent is extruded through an orifice having a predetermined cross-sectional shape along a longitudinal axis. The extruded mass is then cut or sliced transversely to the axis adjacent to the orifice and along a non-linear path across the extruded mass to form a plurality of expandable pieces each of which has a recessed front face. The cut pieces are then cooled to prevent substantial expansion. The slicing of the extruded mass occurs at intervals such that each piece is of a relatively thin thickness which is greater than a transverse width of a rectilinear section of the piece. For example, slicing occurs at intervals of 0.25 to 0.375 inches.

In order to use the foamable pieces for packaging purposes, a mass of the pieces is heated to expand each piece. The heating results in each piece deforming inwardly of itself along the periphery thereof.

The orifice through which the plastified mass is extruded may be of any suitable shape. For example, the orifice may have a rectangular cross-sectional shape such that each cut piece has a like rectangular cross-sectional shape. The orifice may also be of another cross-sectional shape such as oval, circular, fluted-circular, tri-lobal and triangular. Likewise, the resultant cut pieces may have similar cross-sectional shapes.

The cutting of the extruded mass may also be accomplished along different types of non-linear paths. For example, the non-linear cutting path may be V-shaped, or of a semi-circular shape, a zig-zag shape, or a shape having a plurality of contiguous perpendicularly disposed sections.

In one embodiment, the plastified mass is extruded through an orifice which is disposed in a V-shaped groove of a die and which is of rectangular cross-sectional shape with a height twice the width thereof, while a V-shape cut is made in the forward end of the extruded mass by a cutting blade with a V-shaped cutting edge. The pieces which are cut are subsequently heated to expand and deform into shell-like bodies. In one case, the V-shaped cut is made by a blade which has a cutting edge with a angle less than the angle of the V-shaped groove of the die. This produces an elongated shell-like body which tends to be thicker from the center to the outward sides. Upon expanding under heat, the difference in thickness causes the expanding body to bubble or billow while expanding the side outwardly such that the center buckles at the groove formed by the blade. The resulting expanded body is characterized in having a billowed shape with a free inturned peripheral edge defining an open mouth of lesser extent than the surrounding portions of the body.

In another case, the cutting edge of the blade may define an angle equal to or more than the angle of the V-shaped groove of the die. In this case, a body is produced which has a slight gouge or crease running longitudinally of the shell-like body at the bottom of the recess of the body. Upon expanding under heat, the longitudinal crease tends to buckle forwardly while the body billows so that a longitudinal rib forms between two bubbled or billowed sections. The resulting expanded body is characterized in having a billowed shape with two pockets separated by a central rib, i.e., a double bubble.

The apparatus of the invention includes an extruder having a die with at least one orifice for the extrusion of the heat-plastified mass and a rotary cutter with at least one cutting blade having a non-linear cutting edge for cutting the extruded mass. The cutter is disposed in spaced facing relation to the die and moves the cutting edge of the blade through an arcuate path to cut pieces from the extruded mass. For example, the arcuate path of the blade of the cutter may have a four inch radius while the outermost point of the cutting edge is spaced from the die face at a distance of approximately 0.005 inches. With each pass of a blade, the extruded mass is sliced at intervals of 0.25 to 0.375 inches. In this regard, it is to be noted that the mass may extrude a greater distance between cuts. However, the speed of the cutter is synchronized with the output of the extruder to obtain a nominal thickness of approximately 1/64 to 1/4 inches in the direction of extrusion.

The rotary cutter may utilize blades with cutting edges of various shapes. For example, the cutting edges may be pointed tips of triangular shapes, edges of V-shape, semi-circular shape, zig-zag shape or of a shape having a plurality of contiguous perpendicularly disposed sections. Also, the cutter may be provided with blades having different cutting edges. For example, the cutter may be constructed with a pair of diametrically opposed blades with one of the blades having a non-linear cutting edge while the other has a linear cutting edge. A cutter of this type produces pieces with two different types of cut shapes. Specifically, each piece has a substantially flat end caused by the linear cutting edge while the opposite end is of a non-linear shape corresponding either to the outside or to the inside of the cutting edge of the other blade.

In addition, the apparatus includes a cooling means for cooling the cut pieces in order to prevent substantial expansion of the pieces. This cooling means may be in the form of a water tank disposed below the extruder die to receive severed pieces which drop under gravity.

Still further, the apparatus may be provided with a heating means for subsequent heating of the severed pieces in order to expand each piece of the mass into a fully expanded or partially expanded state.

In a case where the heat-plastified mass is extruded through an orifice of rectangular cross-section having a height twice the width thereof and is cut with a blade having a V-shaped cutting edge, the expandable elements have an elongated shell-like body with a generally smooth recessed inner surface and a contorted outer surface. When these expandable elements are subsequently heated and expanded, each element has a shell-like body defining a hollow billowed shape with a free inturned peripheral edge defining an open mouth of lesser extent than the surrounding portions of the body. A loose fill packing material comprised of a plurality of these expanded elements is characterized by having the elements disposed in contiguous non-nesting non-interlocking relation, i.e., in an abutting relation. As such, each element occupies a maximum volume, thus reducing the overall bulk density of the packing material, for example, within a shipping container. For example, the bulk density of the packing material is about 0.25 pounds per cubic foot.

In a case where the orifice is in a V-shaped recess of a die and the blade is spaced closer to the die with a V-shaped cutting edge equal to or more than the angle of the die recess, an expandable body is obtained which gives a double bubble shape upon expanding. As above, a loose fill packing material comprised of these expanded elements has the elements in abutted non-nesting non-interlocking relation.

It is to be noted that the billowed configuration of the expanded elements adds to the resiliency of the elements by imparting a spring-like characteristic. Further, since the mouths of elements are smaller than the surrounding contour, nesting of the elements is substantially eliminated.

It has been found that the cutting of the extruding plastified mass into pieces having end walls of different shapes influences the direction in which expansion occurs when the pieces are expanded. That is, where the front "wall" of each piece is cut on a non-linear path to have a recessed front wall while the rear "wall" is cut to have a complementary shape or a flat shape, the elements have a tendency of expanding in the direction of the rear wall. Thus, if the basic cross-sectional shape is cylindrical, the expanding elements tend to expand in the manner of a balloon. Where the cut cross-sectional shape is rectangular, the expanded state tends to be billowed. In any event, the expandable piece tends to expand at a lesser rate radially than axially so that as the piece expands toward the rear wall, the periphery tends to move relatively radially inwardly. The differential expansion is believed to occur since a tough skin is formed about the periphery of the cut pieces during extrusion while the ends, i.e. the front wall and rear wall are exposed with an open cell structure. Thus, expansion occurs in the direction of least resistance.

Where both end walls of the extruding plastified mass are cut with the same type of cutting edge, the cut pieces have a substantially uniform thickness. In the case where the extruding mass is successively cut with cutting edges of alternating shapes, two types of pieces result.

These and other objects and advantages of the invention will become more apparent from the following detailed description and appended claims taken in conjunction with the accompanying drawings in which:

FIG. 5 illustrates an enlarged exaggerated view of a modified packing element in an expandable state and an expanded state as produced by the cutter of FIG. 4;

Figure 1:
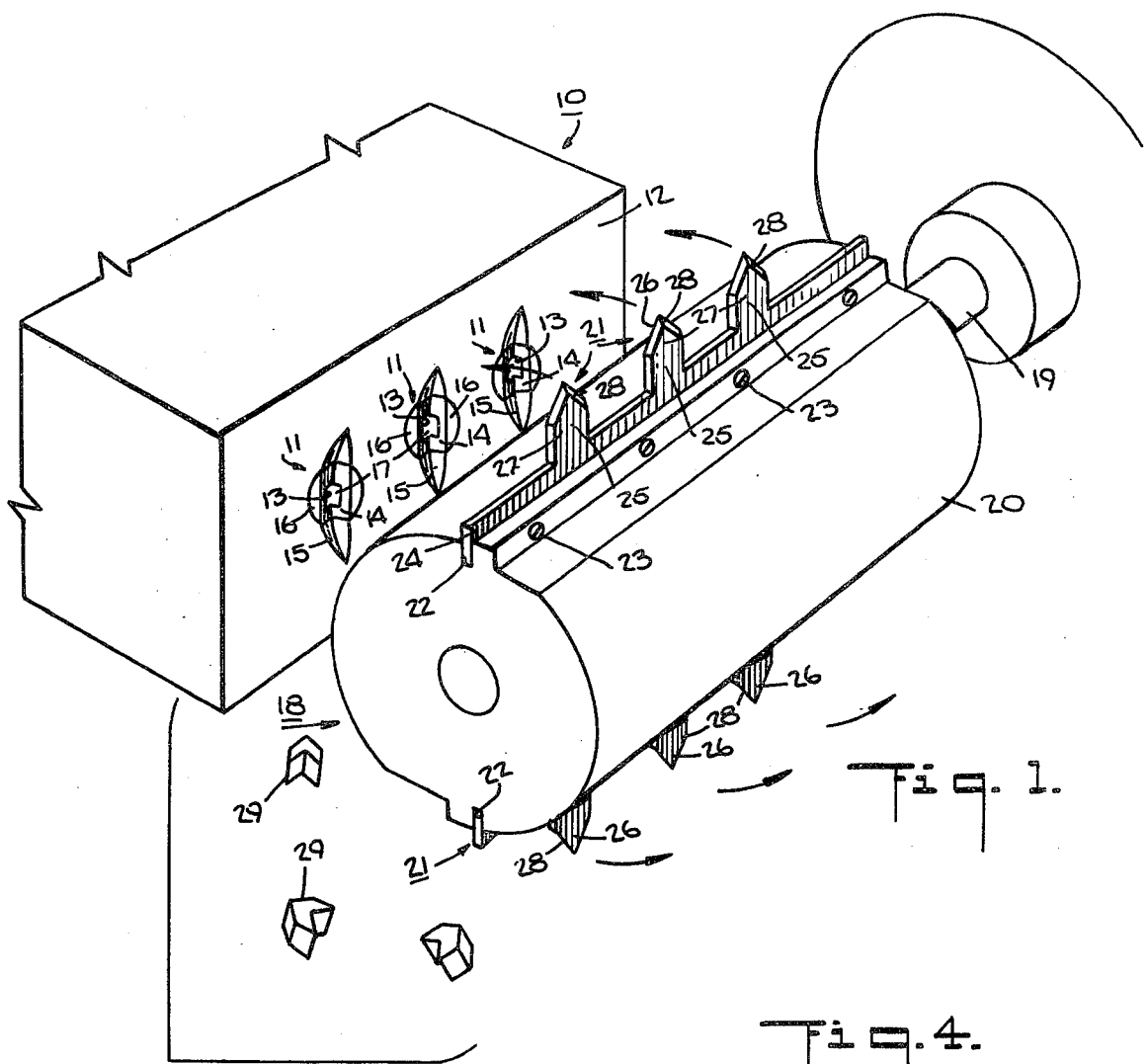
FIG. 1 illustrates a perspective view of an apparatus for making filling elements in accordance with the invention.

Referring to FIG. 1, the apparatus employs an extruder of generally known structure for extruding a heat-plastified mass of thermoplastic material containing an expanding agent. To this end, the extruder includes a die 10 at one end which is constructed in block-like manner. The die 10 has a plurality of cylindrical plugs 11 mounted in a flat end face 12. Each plug 11 has an orifice or bore 13 of rectangular cross-section with a height greater than the width, for example with a height of 1½ times the width. As shown, each plug 11 has a V-shaped vertical groove 14 coincident with the orifice 13 forming an angle of approximately 90° with a depth of e.g. approximately 3/16 inches and a width of approximately 3/16 inches, while the end face 12 of the die 10 has similar curvilinear grooves 15 of V-shaped cross-section forming continuations of the groove 14 in each plug 11. In addition, each plug 11 has two flat surfaces 16, each disposed on an opposite side of the groove 14 to form a continuation of the flat face 12 of the die 10. During operation of the extruder, an extrudate 17 is extruded through each of the orifices 13. The extrudate 17 thus takes on the same cross-sectional shape as the respective orifice 13.

In addition, the apparatus includes a rotary cutter 18 which is mounted on an axis of rotation perpendicular to the longitudinal axes along which the extrudate 17 is extruded from the die 10. The cutter 18 includes a shaft 19, a cylindrical mounting block 20 and a plurality, e.g. two, cutting blades 21. Each blade 21 is mounted in a radial groove 22 of the block 20 and is secured in place via screws 23 which pass through suitable bores (not shown) in the block 20 perpendicularly of the groove 22.

Each blade 21 has an elongated base 24 from which a plurality of cutting edges or points 25 project. Each point 25 has a pointed tip, e.g. of triangular shape, wherein the forward face 26 is of larger dimension than the rear face 27 such that a chamber 28 is formed about the edge of the tip. The pointed tips are spaced from the base 24 so as to provide a clearance to avoid clogging during operation. Further, each pointed tip may form an angle of from 20° to 30° with a length of about ¼ inch.

The cutter 18 is disposed on an axis of rotation which is perpendicular to and co-planar with the axes of extrusion of each orifice 13. The cutter 18 rotates so as to move each cutting point 25 of a blade 21 through an arcuate path to cut V-shaped pieces 29 from the extrudate 17 extruded from each orifice 13. In this case, each blade point 25 forms an angle less than the angle of the associated groove 14 and is spaced from the groove 14 a distance of approximately 0.005 inches.

Figure 2:
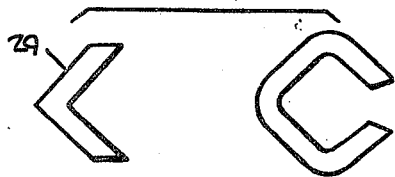
FIG. 2 illustrates an enlarged exaggerated view of a loose fill packing element in an expandable state and an expanded state as produced by the apparatus of FIG. 1.

The cutter 18 is disposed such that the blades 21 cut the extruded mass 17 in a transverse direction adjacent each orifice 13 and along a non-linear path across the extruded mass to form expandable pieces 29 of thermoplastic material. The cutting or slicing of the extrudate 17 is similar to a peeling action in which the pointed edges 25 peel through the extrudate to peel off the pieces 29. As indicated, each cutting point 25 is aligned with a respective orifice 13 to move through a curvilinear groove 15 in the die 10. Hence, each cut piece 29, as shown in FIG. 2, has a recessed front wall (i.e. of substantially V-shape) which corresponds to the shape of the outside surface of a cutting point 25 and a rear wall of complementary shape to the front wall.

The rotary cutter 21 is timed to rotate relative to the speed of extrusion such that the individual pieces 29 have a thickness of, for example, approximately ¼ inch to approximately 1/64 inch.

The pieces 29 are cooled immediately after cutting so as to retain an expandable nature. To this end, the pieces 29 may be allowed to fall under gravity directly into a cooling trough of water, or the pieces may be otherwise cooled after cutting.

Each cooled piece 29 is characterized by having a relatively tough skin about the periphery while the front and rear walls have a less dense surface.

After cooling, the individual pieces may be heated, for example, by using steam, in order to expand the pieces to a larger size. During heating, since the perimeter of the pieces tends to resist expansion, and since the front face of each piece is recessed towards its rear face, expansion takes place primarily in a rearward direction. Thus, each piece deforms inwardly of itself along the periphery into a shell-like body defining a billowed shape with a free inturned peripheral edge defining an open mouth of lesser extent than the surrounding portions of the body.

Prior to expansion, it has been found that the expandable state of the piece 29 has an elongated shell-like body with a generally smooth recessed inner surface and a slightly contorted outer surface. This contorted surface appears to be caused by a small differential expansion of the cut pieces to complete cooling.

Because of the billowed shape of the expanded elements, the elements can be spaced from each other in a mutually contiguous abutting relationship without nesting or interlocking with each other. As such, the expanded elements can occupy a greater volume, for example, within a shipping container. This in turn reduces the overall bulk density of a mass of the elements within the shipping container, and thus reduces the transportation costs of a pcakaged article.

The billowed shape of the expanded elements also adds to the resiliency of the elements relative to each other. That is, each element tends to act as a spring.

The billowed elements may be poured from a hopper directly into a shipping container. To this end, the mouth of each respective element is smaller than its general contour so that adjacent elements do not interlock or nest with one another.

In order to make an expandable filling element, a plastified mass of thermoplastic material containing an expanding agent is extruded through each orifice of the die along a longitudinal axis toward the cutter. As the material extrudes, the cutter repeatedly cuts the extruding material at each orifice in a direction transverse to the longitudinal axis and along a non-linear path across the extruded mass in order to form a plurality of expandable pieces. Each piece has a thickness which is relatively thin. Each cut piece is then cooled, for example, by dropping under gravity into a water bath (not shown) so as to prevent substantial expansion, or cooled by air.

After cooling, a mass of the pieces can be heated to expand each piece for use as a packaging material. Such expansion may be provided after shipment of the expandable pieces to an ultimate user. The pieces may alternatively be slightly expanded under heat by their manufacturer and be shipped in this condition to an ultimate user for further expansion. During expansion, each piece deforms inwardly of itself along the periphery relative to the axial expansion of the piece.

Figure 3:
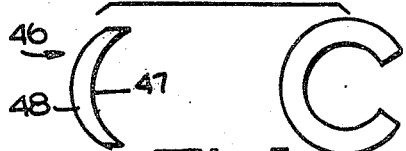
FIG. 3 illustrates a perspective view of a rotary cutter having a modified cutting blade in accordance with the invention.
Figure 6:
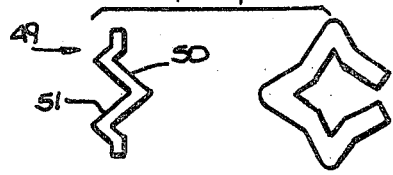
FIG. 6 illustrates an enlarged exaggerated view of a further modified packing element in an expandable state and an expanded state.

Referring to FIG. 3, wherein like reference characters indicate like parts as above, the cutter may utilize a blade 40 of different construction from that described above. As indicated, each blade 40 is of a U-shape with legs 41 disposed in suitable mating recesses 42 in a rotary mounting block 43 and each leg 41 has a suitable bore (not shown) for receiving a screw 44. In addition, each cutting blade 40 has a plurality of non-linear cutting edges 45 for cutting the mass (extrudate 17) extruded through the respective orifices 13. As shown, each cutting edge 45 is of V-shape sized to move through a respective groove 15 of the die 10 and is directed outwardly of the cutter 14.

The pieces which are cut from the extrudate 17 by the blade 40 are of similar shape to those as shown in FIG. 2.

Figure 4:
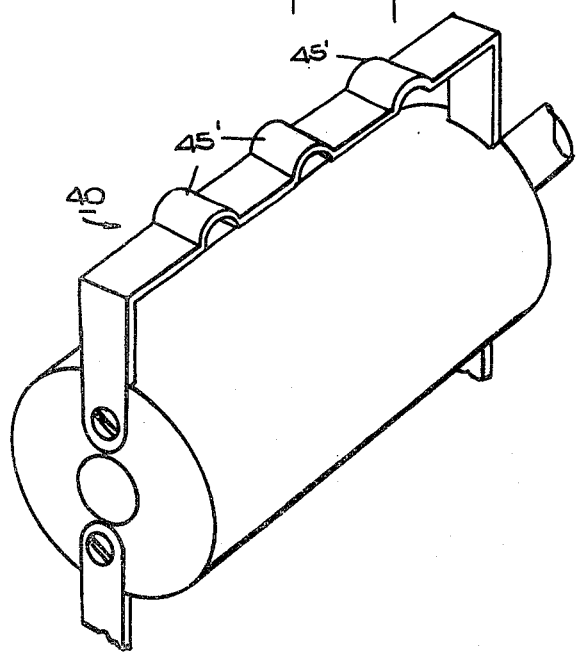
FIG. 4 illustrates an apparatus having a further modified cutter in accordance with the invention.
Figure 3:
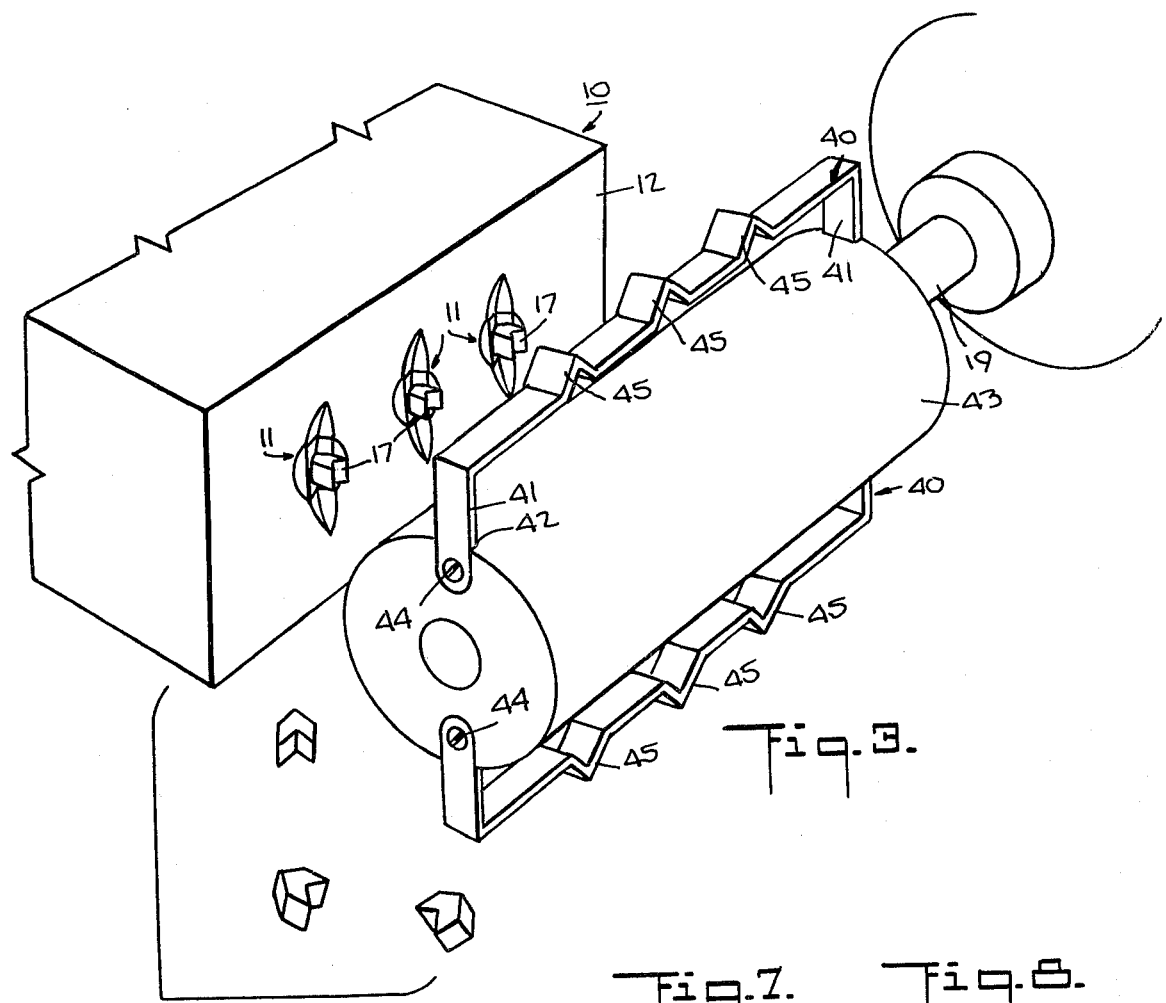
Figure 7:
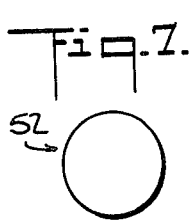
FIGS. 7 to 11 illustrate various orifice shapes for the die of the apparatus according to the invention.
Figure 8:
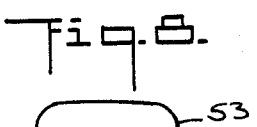
Figure 9:
Figure 10:
Figure 11:
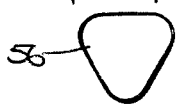

Referring to FIG. 4, wherein like reference characters indicate like parts as above, the blade 40 may alternatively be formed with cutting edges 45' which are of semi-circular shape. In this case, the pieces 46 (see FIG. 5) which are cut from the extrudate have a recessed front face 47 of semi-circular shape and a rear face 48 of similar semi-circular shape. When expanded, as shown in FIG. 5, the pieces tend to take on a bowed shape with a substantially C-shaped cross-section.

Alternatively, the cutting blade may also have cutting edges which are of zig-zag shape so as to produce pieces 49 from the extrudate which have recessed front and rear faces 50, 51, respectively. Such pieces, when expanded tend to form pieces with a star-like cross-section.

Referring to FIGS. 7 to 11, the orifice through which the extrudate is extruded may be other than of rectangular shape. For example, the orifice may be of circular cross-section so as to produce a piece 52 having a similar cross-section (see FIG. 7). Also, the orifice may be of oval, fluted-circular, tri-lobular or triangular shape so as to produce pieces 53, 54, 55, 56 of corresponding cross-sectional shape as shown in FIGS. 8 to 11, respectively, Referring to FIGS. 12 and 13, the cutting blades (not shown) for a cutter may be made with different cutting edges. For example, a cutter may be provided with a cutting blade as shown in FIG. 3 and a cutting blade having a straight edge. In this case, the cutter cuts pieces in pairs with alternating shapes. Specifically, as shown in FIG. 14, the first piece of one pair has a recessed front face conforming to the non-linear cutting edge and a flat rear face formed by the straight cutting edge. The second piece of the pair has a flat front face conforming to the straight cutting edge and a pointed rear face which is of a shape corresponding to the inside edge of the non-linear cutting edge.

Figure 13:
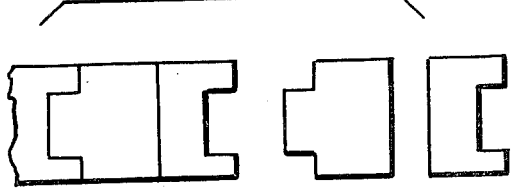
FIG. 13 illustrates a view similar to FIG. 12 of an extrudate cut with a modified cutter having different types of cutting blades in accordance with the invention.
Figure 14:
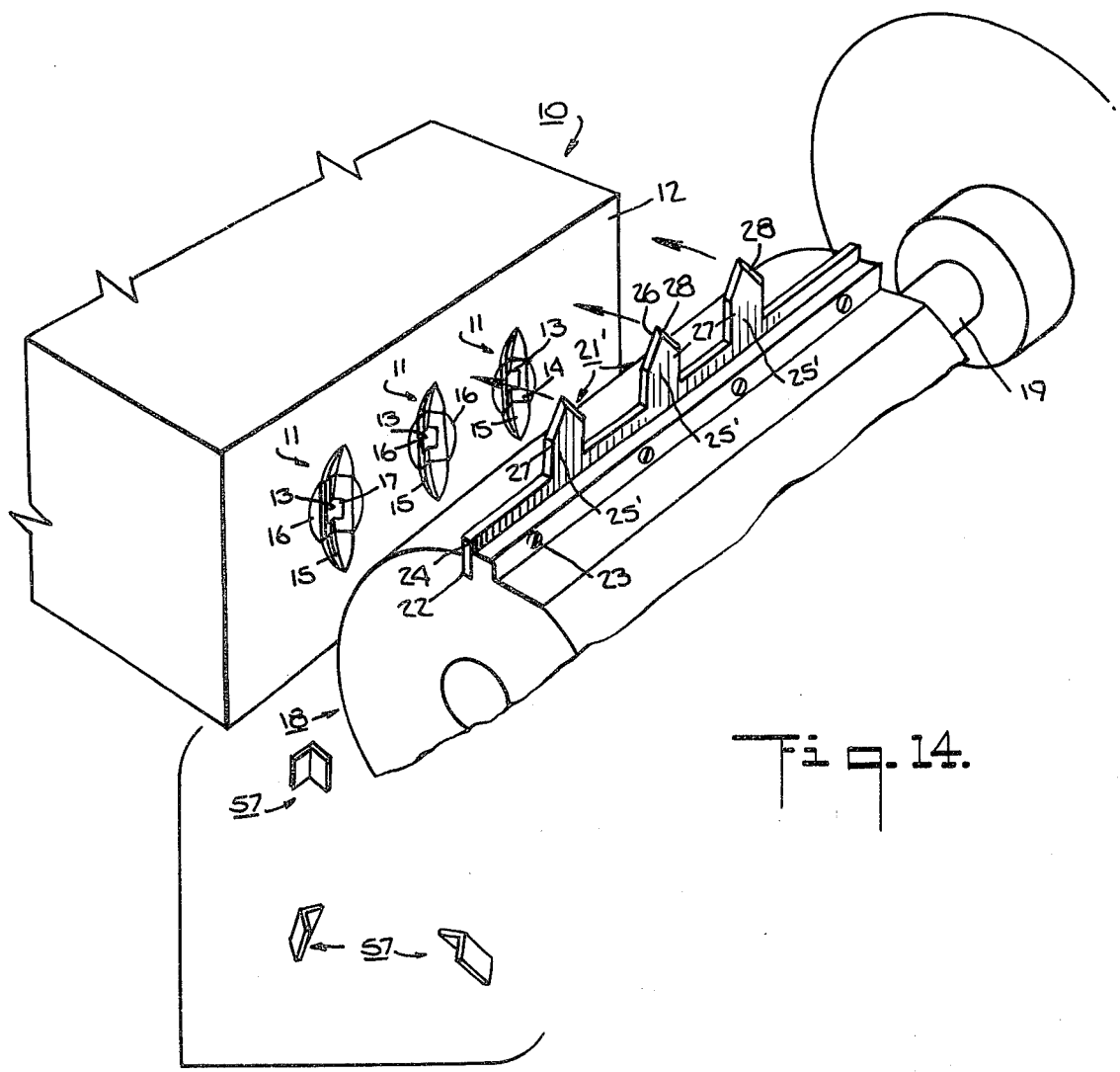
FIG. 14 illustrates a fragmentary view of a further modified apparatus for making filling elements of a double bubble type in accordance with the invention.

As shown in FIG. 13, if a blade having a zig-zag shaped cutting edge is used with a blade having a straight cutting edge, the resulting pieces have correspoiding front and rear faces, as indicated. That is, the front face of a first piece is recessed by a plurality of contiguous perpendicularly disposed sections while the rear face is flat. The second piece of each pair has a flat front face and a rear face which has a projection formed by a plurality of contiguous perpendicularly disposed surfaces.

Figure 12:
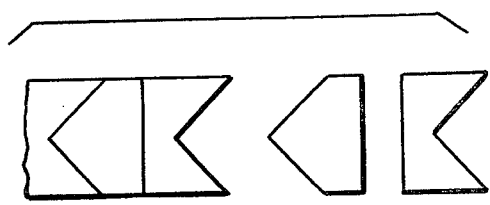
FIG. 12 illustrates a plan view of an extrudate which is cut in accordance with a cutter having different cutting blades in accordance with the invention.

It is to be noted that the various pieces which are cut in the manner shown in FIGS. 12 and 13 with flat front faces tend to expand towards the rear surface due to the larger area of the rear surfaces.

Referring to FIG. 14, wherein like characters indicate like parts as above, the cutter 18 has a pair of blades 21' (only one of which is shown) each of which has cutting points 25' formed at an angle equal to or greater than the angle of the groove 14. For example, the angle of the cutting points 25' is approximately 100° while the width is approximately ¼ inch.

Figure 15:
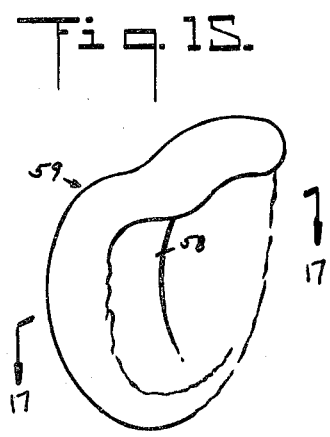
FIG. 15 illustrates a perspective view of an expanded double bubble type of filling element in accordance with the invention.
Figure 16:
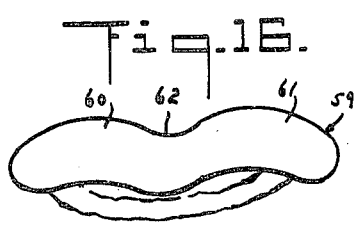
FIG. 16 illustrates an end view of the filling element of FIG. 15.
Figure 17:
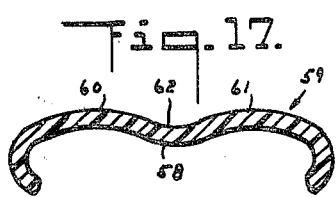
FIG. 17 illustrates a view taken on line 17—17 of FIG. 15.

During operation, with each blade point 25' spaced from a groove 14 a distance of approximately 0.005 inch, the pieces 57 cut and cooled from the extrudate 17 have a scored line or crease down the middle of the front face. Thus, upon heating, the pieces 57 tend to expand less along the crease than in the areas adjacent the crease. As a result, as indicated in FIGS. 15 and 16, a rib 58 tends to form at the crease within the expanding piece while a double bubble is formed. The resulting expanded element 59 is thus characterized in having a double bubble shape (see FIGS. 15 and 17). This double bubble shape is similar in front view to the billowed shape of the pieces 29 described above with respect to FIG. 2 with the addition of a raised central rib 58 along a line corresponding to the crease in the unexpanded state. This formed rib serves to reinforce the expanded piece 59. From the rear, the double bubble shape shows two somewhat hemispherical shapes 60, 61 (i.e. bubbles) merging together along a central longitudinal depression 62 which depression is the backside of the central rib 58 at the front.

The heat at the die 10 may be adjusted, e.g. between 180° to 300° F., to cause various effects in the severed pieces. For example, with a high temperature, each severed piece curls to a closed shell while, with a low temperature, each piece tends to form a completely open shell. The double bubble effect occurs at a temperature of about 200° F.

The shape of the severed piece is also influenced by the thickness of the piece relative to the width of the piece. That is, if the piece is too thick, the "V" cut or crease may not create any double bubble effect. If the piece is too thin, the piece may well break or curl upon itself. Thus, the thickness is controlled, e.g. by the speed of the extrudate from the die 10 and the speed of the cutter 18. Typically, the cutter 18 may rotate at 2000 RPM.

The shape of each piece is also in direct relation to the amount of blowing agent dispersed through the extrudate. If the amount of blowing agent is too low, sufficient expansion will not occur. Thus, the shape will be similar to the immediate shape that occurs upon leaving the cutter 18. If the amount of blowing agent is too high, the severed piece may be torn and ragged as the plastic will not be able to hold the excessive gas and rupturing will occur causing the piece to shred. Nucleators, as are known, may also be used to give a larger or smaller cell structure.

What is claimed is:

1. A method of making expandable filling elements for packaging, said method comprising the steps of
   extruding a plastified mass of thermoplastic material containing an expanding agent through an orifice having a predetermined cross-sectional shape and along a longitudinal axis;
   cutting the extruded mass transversely of said axis adjacent the orifice, and along a non-linear path across the extruded mass to form a plurality of expandable cut pieces; and
   cooling the cut pieces to prevent substantial expansion of the cut pieces.

2. A method as set forth in claim 1 wherein the orifice has a rectangular cross-sectional shape and each cut piece is of rectangular cross-sectional shape.

3. A method as set forth in claim 1 wherein the orifice has an oval cross-sectional shape and each cut piece is of oval cross-sectional shape.

4. A method as set forth in claim 1 wherein the orifice has a circular cross-sectional shape and each cut piece is of circular cross-sectional shape.

5. A method as set forth in claim 1 wherein the orifice has a fluted-circular shape and each cut piece is of fluted-cylindrical shape.

6. A method as set forth in claim 1 wherein the orifice has a tri-lobular cross-sectional shape and each cut piece is of tri-loublar cross-sectional shape.

7. A method as set forth in claim 1 wherein the orifice has a triangular cross-sectional shape and each cut piece is of triangular cross-sectional shape.

8. A method as set forth in claim 1 wherein the extruded mass in cut at intervals of about ¼ inches.

9. A method as set forth in claim 1 wherein the non-linear path is of V-shape.

10. A method as set forth in claim 1 wherein the non-linear path is of arcuate shape.

11. A method as set forth in claim 1 wherein the non-linear path has a plurality of contiguous perpendicularly disposed sections.

12. A method as set forth in claim 1 wherein the non-linear path has a zig-zag shape.

13. A method as set forth in claim 1 wherein the orifice has a cylindrical shape, the non-linear path is of V-shape and each cut piece is of cylindrical shape with a recessed front wall and a rear wall of a shape complementary to said front wall.

14. A method as set forth in claim 13 which further comprises the step of thereafter heating a mass of the cooled pieces to expand each piece of the mass whereby each piece deforms inwardly of itself along the periphery thereof.

15. A method as set forth in claim 1 which further comprises the step of thereafter heating a mass of the cooled pieces to expand each piece of the mass, whereby each piece deforms inwardly of itself along the periphery thereof.

16. A method of making low density loose fill packing elements, said method comprising the steps of
   extruding a plastified mass of thermoplastic material containing an expanding agent through an orifice having a predetermined cross-sectional shape along a longitudinal axis;
   cutting the extruded mass in a transverse direction to said axis adjacent the orifice in cuts alternating along a non-linear path and a linear path across the longitudinal axis of the extruded mass to form a plurality of expandable pieces; and
   cooling the cut pieces to prevent substantial expansion of the cut pieces.

17. A method as set forth in claim 16 which further comprises the step of thereafter heating a mass of the cooled pieces to expand each piece of the mass, whereby each piece of the mass deforms inwardly of itself along the periphery thereof.

18. A method of making expandable filling elements for packaging, said method comprising the steps of
   extruding a plastified mass of thermoplastic material containing an expanding agent through an orifice of rectangular cross-sectional shape with a height twice the width thereof along a longitudinal axis;
   repeatedly cutting the extruded mass along a path in a transverse direction to said axis adjacent the orifice and along a V-shaped path across the extruded mass to form a plurality of expandable pieces, each piece being of relatively thin thickness with a recessed front wall;
   cooling the cut pieces to prevent substantial expansion of the pieces; and
   thereafter heating a mass of the cooled pieces to expand each piece, whereby each piece deforms into a shell-like body defining a billowed shape with a free inturned peripheral edge defining an open mouth of lesser extent than the surrounding portions of the body.

19. In a method of making filling elements for packaging the steps of
extruding a plastified mass of thermoplastic material containing an expanding agent through an orifice of predetermined shape; and
cutting the extruding mass into successive pieces with each successive piece having a recess in a forward wall thereof.

20. A method as set forth in claim 19 which further comprises the steps of cooling the cut pieces to prevent substantial expansion thereof and thereafter heating the pieces to expand each piece into a billowed shape.

21. A method as set forth in claim 19 wherein each successive piece is cut with a crease running longitudinally of said recess therein and which further comprises the steps of cooling the cut pieces to prevent substantial expansion thereof and thereafter heating the pieces to expand each piece into a double bubble shape.

* * * * *